United States Patent
Pettingell

[11] 4,073,979
[45] Feb. 14, 1978

[54] METHOD OF APPLYING MODIFYING INGREDIENTS TO OPEN-CELLED POLYURETHANE MATERIAL

[75] Inventor: Winslow L. Pettingell, Lombard, Ill.

[73] Assignee: Foam Cutting Engineers, Inc., Addison, Ill.

[21] Appl. No.: 697,065

[22] Filed: June 17, 1976

[51] Int. Cl.² .......................... B05D 5/00; B05D 3/12
[52] U.S. Cl. .......................................... 427/244; 8/4; 8/178 E; 260/2.5 A; 260/2.5 AK; 260/2.5 BD; 427/370; 427/378
[58] Field of Search ..................... 427/244, 378, 370; 8/4, 178 E; 260/2.5 AK, 2.5 BD, 2.5 A

[56] References Cited
U.S. PATENT DOCUMENTS

| | | | |
|---|---|---|---|
| 2,200,850 | 5/1940 | Miserentino | 427/244 X |
| 3,057,750 | 10/1962 | Bennett et al. | 427/244 |
| 3,164,436 | 1/1965 | Altermatt | 8/178 X |
| 3,180,853 | 4/1965 | Peters | 8/4 X |
| 3,236,582 | 2/1966 | Ueda et al. | 8/4 |
| 3,432,251 | 3/1969 | Fisher | 8/4 X |
| 3,607,358 | 9/1971 | Dangl et al. | 8/4 X |
| 3,901,648 | 8/1975 | Arband | 8/178 X |

FOREIGN PATENT DOCUMENTS
990,198  4/1965  United Kingdom ................. 427/244

Primary Examiner—Michael R. Lusignan
Attorney, Agent, or Firm—Wegner, Stellman, McCord, Wiles & Wood

[57] ABSTRACT

The method of treating open-celled polyurethane foam by the application of a modifying ingredient, such as a dye, pigment, color stabilizer or fire retardant, for example, wherein the method comprises the steps of (a) applying an excess of a liquid solution or dispersion of the modifying ingredient to a mass of the foam, (b) removing most of the excess of the liquid by squeezing the mass, (c) passing a gas, the temperature of which is between 350° F. and 500° F., through the material for a period of time sufficient (1) to raise the temperature of the polyurethane mass to a point at which the polyurethane will absorb the modifying ingredient, and (2) to vaporize the liquid present in the solution or dispersion, the period of time being insufficient to cause charring of the polyurethane, thereby accelerating the absorption of the modifying ingredient into the polyurethane, so as to permanently incorporate the modifying ingredient into the foam, and (d) allowing the mass to cool. The gas is chosen so as to be inert with respect to the foam, the modifying ingredient, and the liquid.

11 Claims, 2 Drawing Figures

METHOD OF APPLYING MODIFYING INGREDIENTS TO OPEN-CELLED POLYURETHANE MATERIAL

CROSS-REFERENCE TO RELATED APPLICATION

This application is related to U.S. patent application Ser. No. 697,064, entitled "Apparatus for Applying Modifying Ingredients to Open-Celled Polyurethane Material" owned by the assignee of the present application, and now abandoned.

BACKGROUND OF THE INVENTION

1. Field of the Invention

This invention relates to methods of modification of foamed plastic articles and, more particularly, to methods of applying modifying ingredients to a mass of open-celled polyurethane foam.

2. Description of the Prior Art

Previous methods of applying dyes, pigments and other modifying ingredients to open-celled polyurethane foam and other open-celled foams were based generally upon adhesion of the modifying ingredient to the surface of the foam, as by painting, or upon physical mixing of the modifying ingredient with the constituents prior to foam formation.

For example, polyurethane fabrics, not greater than about 3/32 inch thick, may be dyed by various methods well known in the art, such as rope dyeing, or pigments and/or inert fillers may be added to one or more of the reactants before they are mixed in the mixing head of the well-known "one shot" reaction system commonly used in continuous polyurethane foam slab production.

One major disadvantage attached to foams produced from constituents compounded with modifying ingredients in the dilution of the characteristics of the modifying ingredient experienced during the expansion of the reaction mixture into foam. For example, if a pigment is mixed with one or more of the reactants before foaming, the foamed product will exhibit a lighter shade of color than would be imparted by direct application of the pigment to the foam's surface. It is extremely difficult to control the color of the final product in this situation.

It may be noted that previous attempts at dyeing a mass of foam by immersion, as by kettle dyeing, when the thickness of the mass is greater than about 3/32 inch, have been unsuccessful due to the inability of the foam mass to dry at a uniform rate throughout. This is due to the natural insulating properties of the foam combined with the tendency of open-celled foam to retain relatively large amounts of liquid in its cells. The added weight of the retained liquid is another factor that has made immersion dyeing of foams impractical. In foams comprising a fabric whose thickness is less than about 3/32 inch, this problem is not great as vaporization is not effectively hindered. Only when the thickness of the foam is less than about 3/32 inch will effective drying occur so as to allow profitable production.

Another adhesion method of coloring polyurethane foam is spray painting of the foam article, such as a grill cloth for a speaker system. This is accomplished by directly spraying paint onto the surface of the foam by means of conventional paint sprayers. This method is unsatisfactory due to a lack of penetration of the paint into the foam and undesirable changes in the surface characteristics of the foam.

Previous methods of treating foam generally required relatively high setup costs, thereby making short production runs unprofitable. This has proven inconvenient for producers whose customers desire relatively small quantities of treated foam.

SUMMARY OF THE INVENTION

It is an object of the invention to provide a new and improved method of applying modifying ingredients to open-celled foam articles and, more specifically, to open-celled polyurethane foam articles.

It is a further object of the invention to provide a method of applying modifying ingredients to open-celled polyurethane foam so as to eliminate some undesirable attributes of the finished product, such as crocking of dyes and nonuniformity of color through the mass, for example.

Another object of the invention is to provide a method of applying modifying ingredients to open-celled polyurethane foam so as to avoid dilution of the desirable qualities of the ingredient when the ingredient is incorporated into the foam.

A further object of the invention is to provide a method of applying modifying ingredients uniformly throughout a mass of open-celled polyurethane foam when the thickness of the foam is greater than about 3/32 inch.

Another object of the invention is to provide a method of applying modifying ingredients to a mass of open-celled polyurethane foam wherein the total time period required for processing the foam is relatively short.

Yet another object of the invention is to provide a method of applying modifying ingredients to a mass of polyurethane foam whereby setup costs for practicing the method are relatively low, thereby making short production runs practical.

THE DRAWINGS

FIG. 1 is a longitudinal central sectional view of an apparatus for practicing the method; and FIG. 2 is a transverse sectional view taken substantially as indicated along line 2—2 of FIG. 1.

DETAILED DESCRIPTION OF THE INVENTION

Figure 1:
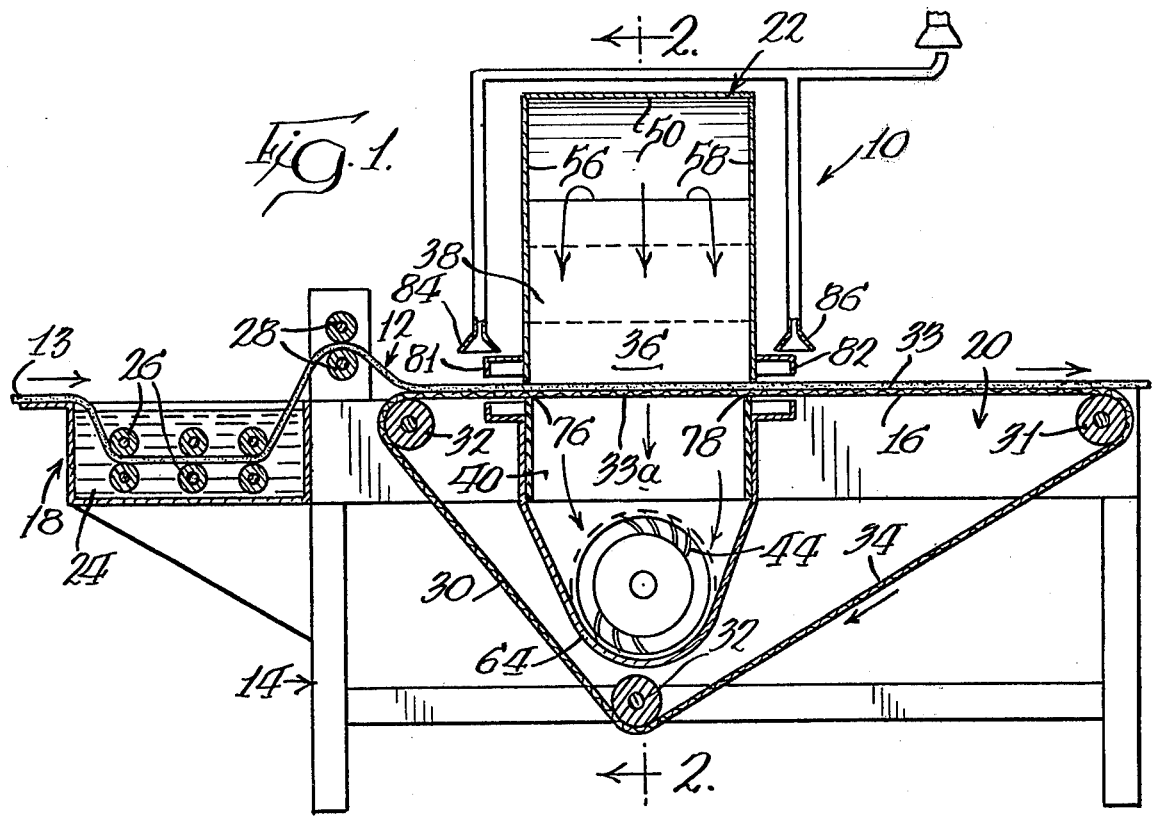

Referring to the drawings in detail, an apparatus generally designated 10, which applies a modifying ingredient to a mass 12 of open-celled polyurethane foam consists generally of a base 14 which includes a planar horizontal support 16, a tank 18, endless conveyor means 20, and heated gas circulation means 22.

The purpose of the invention is to apply a modifying ingredient throughout the mass of open-celled polyurethane foam 12, which is illustrated as a continuous strip 13, but which may be in the form of separate slabs for batch treatment.

An excess of a liquid solution or dispersion of the desired modifying ingredient is applied to the mass 12 from a bath 24 in the tank 18. The choice of modifying ingredients depends, of course, on the properties desired to be imparted to the mass. Exemplary ingredients include dyes, pigments, color stabilizers (such as titanium dioxide) and fire retardants. The concentration of modifying ingredient should be substantially uniform throughout the bath, and the solvent or dispersing liquid must be inert with respect to the polyurethane, as is water, for example.

The excess of liquid solution or dispersion may be applied in any manner, it being important, however, that the solution or dispersion permeate the open-celled structure of the foam and contact all portions of the mass 12. When a continuous strip 13 is treated, it runs between opposed rollers 26 which keep the strip 13 immersed in the bath 24 and remove entrapped air therefrom. For batch operation, slabs are successively dipped in the bath 24.

After the excess of liquid solution or dispersion is applied to the strip 13, most of said excess is removed by passing the strip through driven rubber pinch rollers 28, which also forward the strip onto the conveyor 20. When slabs are treated, they are fed seriatim into the rubber pinch rollers 28. The solution or dispersion thus removed is returned to the bath 24 by any suitable means.

The conveyor 20 consists of an endless open mesh belt 30 which travels about a drive drum 31 and idler drums 32 which carry it in the direction of the arrow 20 through a horizontal working run 33 and a return run 34.

One portion 33a of the horizontal working run 33 traverses and is effectively enclosed by a chamber 36 of gas circulating means 22, said chamber comprising an upper portion 38 and a lower portion 40 disposed above and below the horizontal working run 33, respectively.

Figure 2:
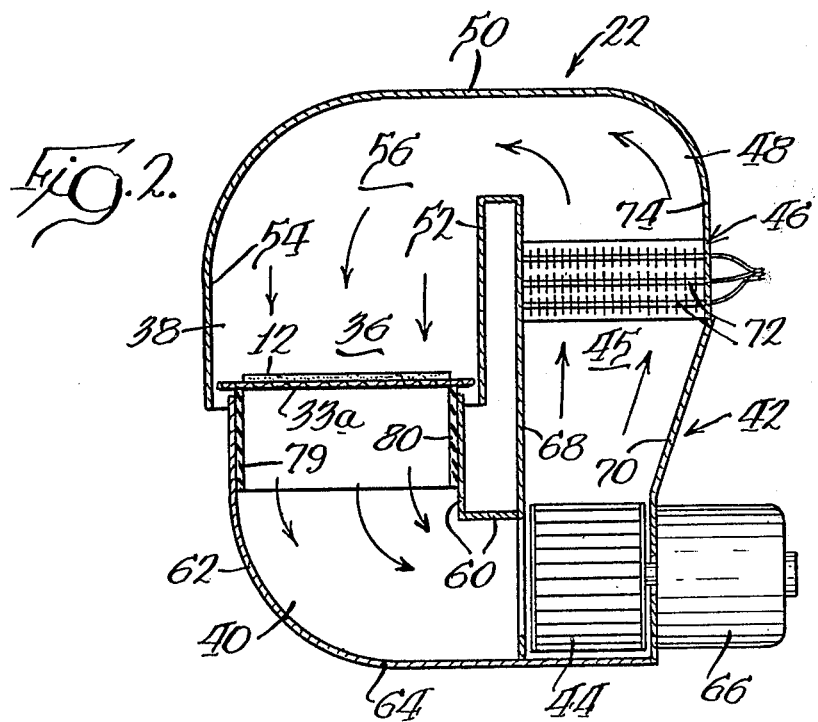

Referring to FIG. 2, gas circulation means 22 constitutes an endless conduit system comprising said chamber 36 (including portions 38 and 40), and a housing 42 containing fan means 44 and heating means 46. Portion 38 is defined by said portion 33a of horizontal working run 33, a part of upper wall 50, inner wall 52, outer wall 54, and parts of front and rear walls 56 and 58 seen in FIG. 1.

The endless conduit system has a hood-like upper member which includes the upper portion 38 of the chamber 36 and an upper part 48 of the housing 42; and it also includes a trough-like lower member which provides the lower portion 40 of the chamber and constitutes the air inlet for the fan 44.

The trough-like lower member 40 is defined by said portion 33a of horizontal run 33, inner wall 60, outer wall 62 and arcuate side and bottom wall 64, wall 64 being best seen in FIG. 1. Referring again to FIG. 2, the fan means 44 is a conventional type of fan or blower, powered by motor means 66. In operation, fan 44 circulates gas in the direction of the arrows shown in FIG. 2. The lower part of housing 42 is formed by part of inner wall 68, outer wall 70, a transverse wall 45 extending between walls 68 and 70, and a transverse wall (not shown) which is parallel to the wall 45.

The heating means 46 is located above, and thus downstream from the fan 44, and illustratively comprises a plurality of electric heating elements 72. The upper part 48 of housing 42 is defined by the upper margin of heating means 46, part of inner wall 68, an outer wall 74, upper wall 50 and parts of front and rear walls 56 and 58 extending transversely between walls 68 and 74.

Referring to FIG. 1, it may be noted that horizontal run 33 of conveyor 20 and foam mass 12 carried thereon enter chamber 36 through an elongate slot-shaped opening 76 and exit said chamber through an elongate slot-shaped opening 78, and the bottom of horizontal run 33 contacts upstanding sealing walls 79 and 80, seen in FIG. 2. The vertical dimension of openings 76 and 78 corresponds closely to the vertical dimension of the combination of horizontal run 33 and mass 12, thereby effecting seals about the mass 12 and run 33. It is to be understood that said seals are intended only to contain most of the circulating gas and not to provide absolute containment, so they permit the escape of vaporized liquid and some heated air and the entry of make-up air to the system. Hood assemblies 81 and 82 are disposed above the entrance and exit openings 76 and 78, respectively. Suitable exhaust means 84 and 86 are provided above the hoods 81 and 82 to remove escaping air and vapors.

After the mass 12 is forwarded onto conveyor 20 by rollers 28, the mass 12 is carried by said conveyor into chamber 36 where said mass is contacted by the heated gas being circulated about the closed conduit system.

Gas, which commonly is air, but which may be another gas or mixture of gases in certain situations, is circulated by means of fan 44, is heated to a temperature between 350° F. and 500° F. by heating means 46, and is directed into chamber 36 where it flows downwardly through mass 12 and horizontal run 33. Air is drawn from portion 40 by means of suction produced by fan 44, thereby creating a pressure differential between portions 38 and 40, the pressure in portion 40 being slightly less than that in portion 38, resulting in the downward flow of air from portion 38, through mass 12, to portion 40.

The downward air flow through the mass 12 and the conveyor surface 33 raises the temperature of the mass 12 and the entrapped liquid from the bath 24 at least to the vaporization temperature of the liquid solvent or dispersion agent under the ambient conditions of operation, so as to vaporize said liquid, the vapors being removed from the mass 12 by the flow of heated air.

The precise way in which the method operates is not clearly understood, but it is believed that as the polyurethane rises to a temperature above about 350° F., the mass 12 reaches a state similar to that during the exothermal reaction period of the foaming process. While the foam is in this state, a modifying ingredient becomes permanently fixed substantially homogeneously throughout the structure of the foam.

This requires, of course, that the circulating gas first vaporize the solvent or dispersion agent, and that the heating of the mass be continued, after vaporization is completed, for a sufficient time to raise the temperature of the mass to at least about 350° F., and that this temperature be substantially uniform from top to bottom of the mass.

It is important that the mass 12 not maintain a temperature above approximately 475° F. for an extended length of time, as polyurethane begins to char at about that temperature. This, of course, must be totally avoided. Therefore, it is necessary that (a) the liquid solvent or dispersing agent be one whose vaporization temperature at the ambient conditions of operation is below the charring point of the mass 12, approximately 475° F., and (b) no part of the mass 12 remains in the oven chamber 36 for a period of time sufficient to allow the mass to char, even if the air temperature is above 475° F. The residence time of the mass 12 must be adjusted, as by adjustment of the speed of the conveyor 33, so as to assure that the liquid is vaporized, yet charring of the mass 12 is totally avoided.

After the modifying ingredient is thus fixed to the structure of foamed mass 12, the mass 12 exits the gas circulating means 22 via the opening 78. The mass 12 is allowed to cool before further cutting, shaping, etc., is undertaken. It may be noted that the cooling process is extremely rapid, due to the low specific heat and low apparent density of the polyurethane mass 12. No more than a trace of free modifying ingredient remains on the surfaces of the mass, and this is easily removed by a simple rinse. Further operations may be undertaken almost immediately after the mass 12 exits the gas circulating means 22 and is rinsed.

A specific example will provide an illustration of the practice of my invention.

A piece of reticulated polyurethane foam measuring 13½ inches × 24 inches × 1 5/16 inches and weighing 4¾ oz., and previously pigmented to achieve a medium gray or charcoal shade, was placed in a dispersion dye bath containing a water dispersion composed of 1.2% intrasil brown 3R dye, 0.3% intrasil brilliant blue 2G dye and 98.5% $H_2O$. After being immersed from 10-15 seconds, the foam was moved through pinch rollers whereby the excess dispersion was removed from the mass.

The foam was placed upon a screen conveyor which moved it into an oven chamber, the temperature of which was maintained at 420° F. by circulation of heated air through a continuous circuit of which the oven was an integral part through which the air was drawn downwardly.

The gas circulation system included an air blower rated at a capacity of 1500 CFM, and nine (9) electric strip heaters, each capable of producing 2,000 watts, for a total heating capacity of 18,000 watts. The cross-sectional area of the oven chamber was 5 ft.$^2$ (2 ft. × 2½ ft.), thereby allowing air to circulate at a velocity of 4 to 5 ft./sec. The conveyor speed was set at 2.5 ft./min. in order to position the foam in the oven for approximately one minute, that period of time determined previously to be sufficient to allow complete boil-off of the water and incorporation of the dye materials into the foam. After passing through the downwardly drawn flow of air in the oven, the foam passed out of the oven, whereupon it returned to room temperature almost immediately.

Upon completion of the above process, the pad exhibited a dark mahogany brown shade which had a minimum of wet or dry crock. A simple water bath removed the very minimal amount of excessive dye, giving a product with excellent crock properties and light fastness.

It may be understood that the use of the subject invention is limited to those polyurethane foams which exhibit an open-celled structure which allows penetration by the flow of heated gaseous material. It should also be noted that either polyester or polyether urethanes may be employed with equally good results.

The foregoing detailed description is given for clearness of understanding only and no unnecessary limitations should be understood therefrom, as modifications will be obvious to those skilled in the art.

I claim:

1. The method of applying a modifying ingredient to a mass of open-celled polyurethane foam, said method comprising the consecutive steps of:
    applying an excess of a liquid solution or dispersion of said modifying ingredient to the mass of foam, said liquid being inert with respect to said foam;
    squeezing the mass to remove most of said excess;
    thereafter passing heated gaseous material entirely through the mass containing the remainder of said liquid solution or dispersion to rapidly raise the temperature of the entire mass, the temperature of said gaseous material being in the range of 350° F. to 500° F., said temperature being at least as high as the vaporization temperature of the liquid under the ambient condition of operation, the gaseous material being inert with respect to the polyurethane, the modifying ingredient and the liquid, and the period of exposure of the mass to the gaseous material being insufficient to allow charring of the foam, whereby the liquid is vaporized and the modifying ingredient is effectively simultaneously incorporated into the foam in a very short time;
    and permitting the mass to cool.

2. The method of claim 1 wherein the gaseous material is air.

3. The method of claim 1 wherein the liquid is water.

4. The method of claim 1 wherein the gaseous material is circulated downwardly through the foam by suction.

5. The method of claim 1 wherein the modifying ingredient is a dye.

6. The method of claim 1 wherein the modifying ingredient is a pigment.

7. The method of claim 1 wherein the modifying ingredient is a color stabilizer.

8. The method of claim 7 wherein the color stabilizer is titanium dioxide.

9. The method of claim 1 wherein the modifying ingredient is a fire retardant.

10. The method of claim 1 wherein the liquid solution or dispersion is applied by means of passing the mass through a bath of said liquid solution or dispersion for a period of time sufficient to allow said liquid solution or dispersion to permeate said mass.

11. The method of claim 1 wherein the mass is exposed to the heated gaseous material for a time not exceeding about one minute.

* * * * *